(12) United States Patent
Kitagawa (10) Patent No.: US 9,751,587 B2
(45) Date of Patent: Sep. 5, 2017

(54) ABS UNIT ATTACHMENT STRUCTURE AND MOTORCYCLE

(71) Applicant: SUZUKI MOTOR CORPORATION, Hamamatsu-shi, Shizuoka (JP)

(72) Inventor: Yuji Kitagawa, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/201,925

(22) Filed: Jul. 5, 2016

(65) Prior Publication Data

US 2017/0008600 A1   Jan. 12, 2017

(30) Foreign Application Priority Data

Jul. 6, 2015   (JP) .................................. 2015-135130

(51) Int. Cl.
| | |
|---|---|
| *B62L 1/00* | (2006.01) |
| *B60T 8/36* | (2006.01) |
| *B62K 19/38* | (2006.01) |
| *B62K 25/00* | (2006.01) |

(52) U.S. Cl.
CPC ............ *B62L 1/005* (2013.01); *B60T 8/3685* (2013.01); *B62K 19/38* (2013.01); *B62K 25/005* (2013.01)

(58) Field of Classification Search
CPC .................................................. B60T 8/3685
See application file for complete search history.

(56) References Cited

U.S. PATENT DOCUMENTS

| | | | |
|---|---|---|---|
| 5,419,625 A | 5/1995 | Iwase et al. ............... | 303/116.1 |
| 7,350,881 B2 * | 4/2008 | Asahi .................... | B60T 8/3685 180/232 |
| 7,669,680 B2 * | 3/2010 | Hasegawa ............. | B60T 8/3685 180/219 |
| 8,002,066 B2 * | 8/2011 | Harada ................. | B60T 8/3685 180/219 |

FOREIGN PATENT DOCUMENTS

| | | |
|---|---|---|
| DE | 43 24 099 C1 | 7/1994 |
| DE | 693 09 039 T2 | 6/1997 |
| DE | 10 2004 034226 B4 | 8/2014 |
| EP | 1 531 104 A1 | 5/2005 |
| EP | 2 048 051 A2 | 4/2009 |
| JP | 2010-76511 A | 4/2010 |

OTHER PUBLICATIONS

German Office Action dated Feb. 8, 2017, issued by the German Patent and Trademark Office in corresponding application DE 10 2016 008 228.3.

* cited by examiner

*Primary Examiner* — Kevin Hurley
(74) *Attorney, Agent, or Firm* — Stein IP, LLC (57) ABSTRACT

The invention is directed to an ABS unit attachment structure including: a floating bracket which is fixed to a vehicle body frame via a vibration absorbing member; an ABS unit attached to a first attachment surface of the floating bracket; and a weight attached to a second attachment surface of the floating bracket, and a motorcycle including the ABS unit attachment structure.

7 Claims, 5 Drawing Sheets

← REAR SIDE

FRONT SIDE →

ABS UNIT ATTACHMENT STRUCTURE AND MOTORCYCLE

CROSS-REFERENCE TO RELATED APPLICATIONS

This application claims the benefit of Japanese Patent Application JP 2015-135130, filed Jul. 6, 2015, the entire content of which is hereby incorporated by reference, the same as if set forth at length.

FIELD OF THE INVENTION

The present invention relates to an attachment structure including an ABS unit for preventing a slide due to wheel locking and a motorcycle equipped with the attachment structure.

BACKGROUND OF THE INVENTION

In general, motorcycles are equipped with an ABS (antilock brake system) unit to prevent wheel locking at the time of sudden braking. ABS units should satisfy strict vibration conditions, which necessitates a superior measure against vibration. A vibration preventive measure for an ABS unit is known in which the ABS unit is supported by a vehicle body frame in a floated manner via vibration absorbing members (refer to JP-A-2010-76511, for example). In this ABS unit attachment structure, a bracket of the ABS unit is screwed to the vehicle body frame via the vibration absorbing members, whereby vibration coming from the vehicle body frame is absorbed by the vibration absorbing members and vibration to travel to the ABS unit is suppressed.

SUMMARY OF THE INVENTION

However, there are vehicles in which vibration conditions for an ABS unit are not satisfied merely by the floating support using vibration absorbing members as in the ABS unit attachment structure disclosed in JP-A-2010-76511. In these cases, it is necessary to review the layout involving the ABS unit so that it is installed at such a location to which vibration coming from the vehicle body frame is less prone to travel. This may restrict the layout involving the ABS unit.

The present invention has been made in the above circumstances, and an object of the invention is therefore to provide an ABS unit attachment structure that can sufficiently suppress vibration to travel to the ABS unit though being simple in configuration as well as a motorcycle equipped with it.

An ABS unit attachment structure of the present invention is characterized by comprising: a floating bracket which is fixed to a vehicle body frame via a vibration absorbing member; an ABS unit attached to a first attachment surface of the floating bracket; and a weight attached to a second attachment surface of the floating bracket.

With this configuration, since the floating bracket is supported by the vehicle body frame in a floated manner via the vibration absorbing member, vibration coming from the vehicle body frame is absorbed by the vibration absorbing member. The floating bracket is made less prone to vibrate because the total weight of what are supported by the floating bracket is increased by attaching, to the floating bracket, the weight in addition to the ABS unit. Therefore, vibration coming from the vehicle body frame is made less prone to travel to the ABS unit, which means that an effective vibration preventive measure has been taken for the ABS unit. Furthermore, the layout involving the ABS unit is not restricted by the vibration preventive measure and, instead, is increased in the degree of freedom.

In the ABS unit attachment structure of the present invention, it is preferable that the first attachment surface and the second attachment surface are a top surface and a back surface of the floating bracket, respectively. In this configuration, the ABS unit is attached to the top surface of the floating bracket and the weight is attached to the back surface of the floating bracket. Since the ABS unit and the weight are arranged so as to overlap with each other in a plan view, vibration of the ABS unit can be suppressed by bringing the center of gravity of the weight closer to that of the ABS unit.

In the ABS unit attachment structure of the present invention, it is preferable that the weight is an exhaust valve actuator. In this configuration, the floating bracket to which the exhaust valve actuator is attached is supported by the vehicle body frame in a floated manner via the vibration absorbing member and hence an effective vibration preventive measure is also taken for the exhaust valve actuator. Since the floating bracket is shared by the ABS unit and the exhaust valve actuator, it is not necessary to provide separate brackets for them. Thus, the number of components is reduced, which enables reduction in weight and cost.

In the ABS unit attachment structure of the present invention, it is preferable that the floating bracket is fixed to the vehicle body frame so that the exhaust valve actuator is located over an exhaust valve. With this measure, the exhaust valve actuator can be disposed closer to the exhaust valve and hence the wires that link the exhaust valve actuator and the exhaust valve can be shortened.

A motorcycle of the present invention is characterized by comprising the ABS unit attachment structure. With this configuration, an effective vibration preventive measure can be taken for the ABS unit. In the motorcycle, the layout involving the ABS unit can be increased in the degree of freedom.

In the ABS unit attachment structure according to the invention, in addition to the ABS unit the weight is attached to the floating bracket, which is an effective vibration preventive measure taken for the ABS unit. In the motorcycle, the layout involving the ABS unit can be increased in the degree of freedom.

DESCRIPTION OF SYMBOLS

1: Vehicle body frame
20: ABS unit
50: Frame bracket
51: Floating bracket 52: Top surface of floating bracket (first attachment surface)
53: Back surface of floating bracket (second attachment surface)
61: Rubber bush (vibration absorbing member)
70: Exhaust valve actuator (weight)
76: Exhaust valve

DETAILED DESCRIPTION OF THE INVENTION

Figure 1:
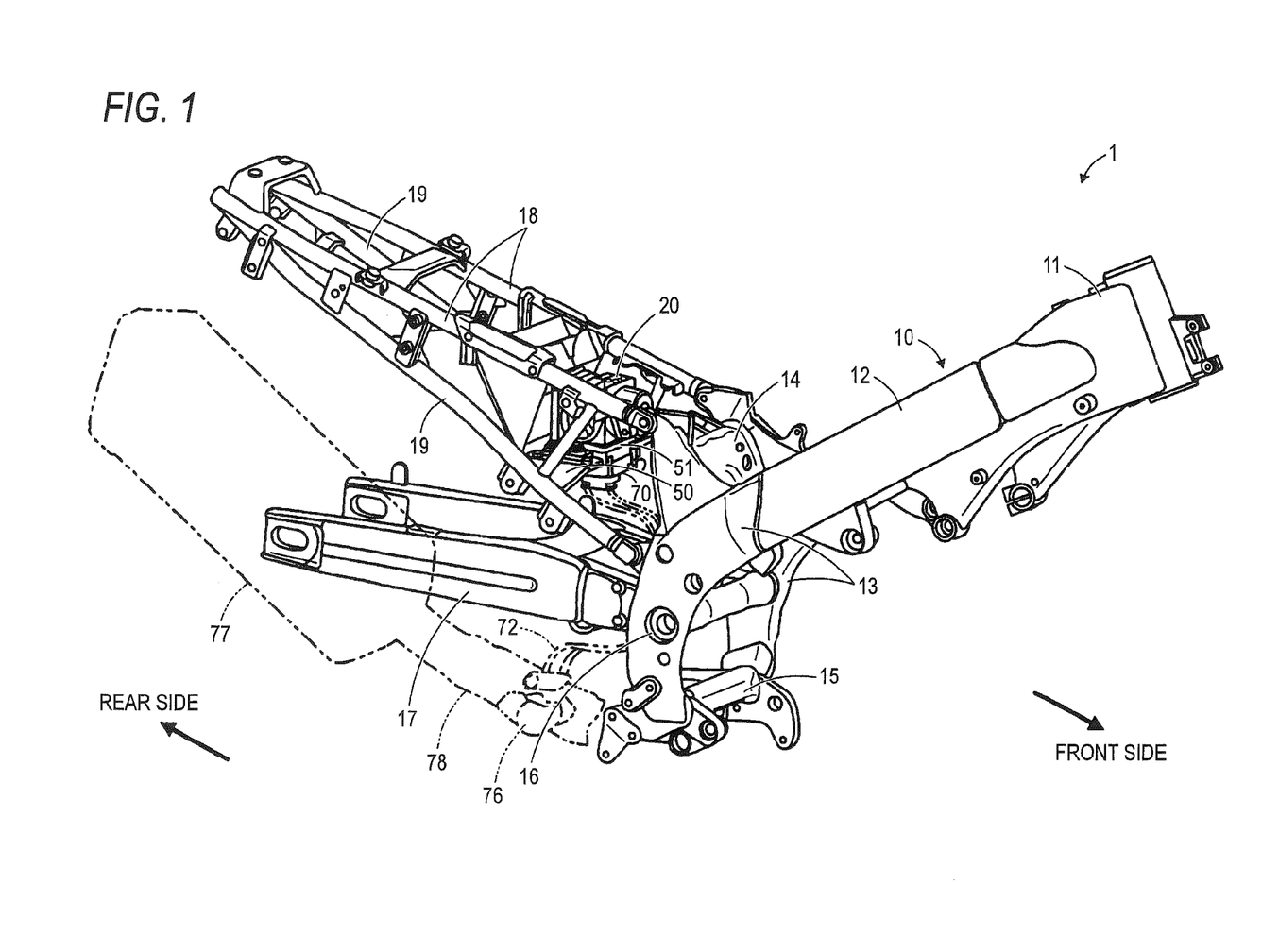
FIG. 1 is a perspective view of a vehicle body frame employed in an embodiment of the present invention.
Figure 2:
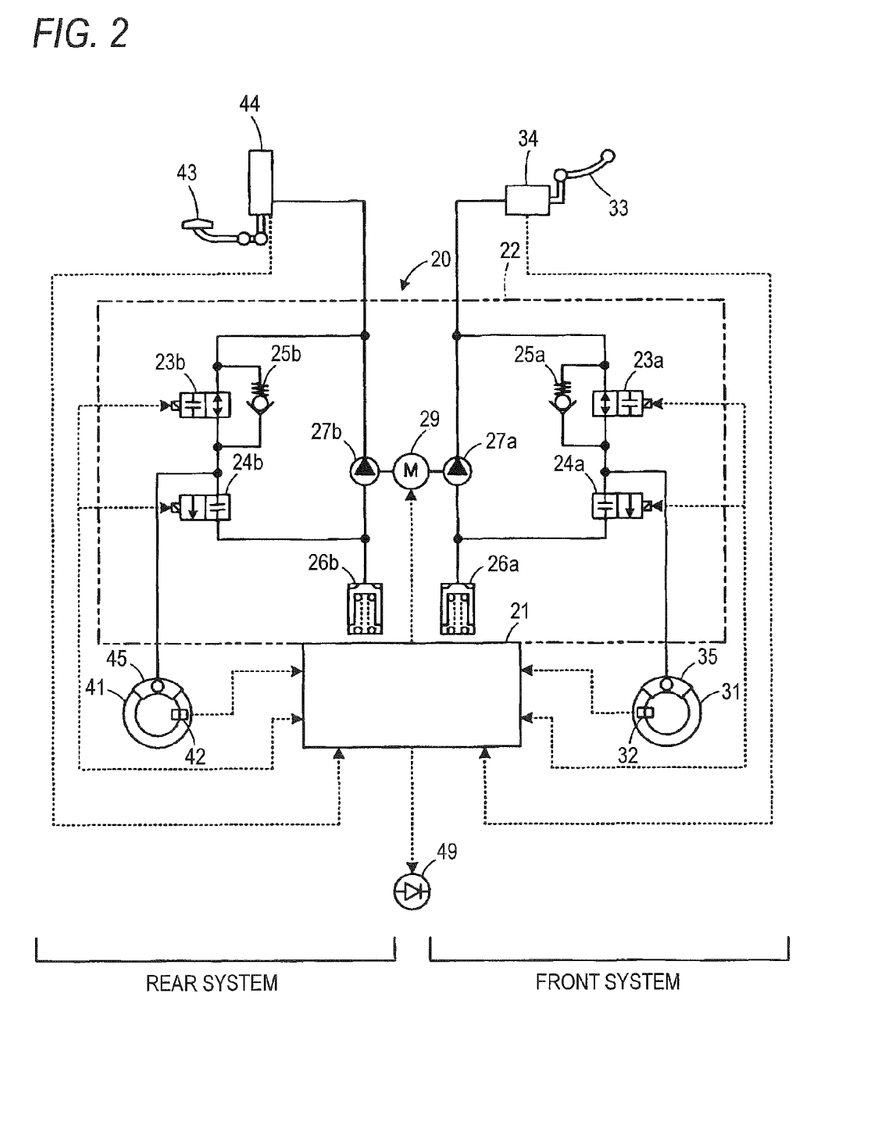
FIG. 2 is a system image diagram of ABS that relates to the embodiment.

An embodiment of the present invention will be hereinafter described in detail with reference to the accompanying drawings. Although the embodiment will be directed to an ABS unit attachment structure that is applied to a motorcycle, the application field of the invention is not limited to motorcycles and includes such saddle-ridden vehicles as tri-wheel vehicles. FIG. 1 is a perspective view of a vehicle body frame employed in the embodiment. FIG. 2 is a system image diagram of ABS that relates to the embodiment. For convenience of description, in FIG. 1 a collecting pipe 78, a muffler 77, etc. are drawn by two-dot chain lines.

As shown in FIG. 1, a vehicle body frame 1 is formed by attaching seat rails 18 and subframes 19 to a twin-spar frame 10 which is mounted with various electric units etc. and made of steel or an aluminum alloy. In the twin-spar frame 10, a pair of, that is, left and right, tank rails 12 branch off from a head frame 11 located at the front end and extend rearward and a pair of body frames 13 extend downward from the rear ends of the tank rails 12, respectively. The head frame 11, the tank rails 12, and the body frames 13 form an accommodation space for an engine (not shown) etc. The vehicle body frame 1 is reinforced by suspending the engine on them.

The pair of body frames 13 are linked to each other by an upper bridge 14 on the upper side and by a lower bridge 15 on the lower side. The pair of body frames 13 are formed with respective swing arm pivots 16 to which respective swing arms 17 which support a rear wheel (not shown) are connected so as to be swingable in the vertical direction. A top portion of a rear cushion unit 75 (see FIG. 5) for suspension of the rear wheel is connected to the upper bridge 14, and a bottom portion of the rear cushion unit 75 is linked to the lower bridge 15 and the swing arms 17 by link mechanisms.

The pair of seat rails 18 which extend up rearward are connected to top portions of the pair of body frames 13, respectively. The pair of seat rails 18 are supported auxiliarily by the respective subframes 19 which connect intermediate portions, in the height direction, of the body frames 13 and rear end portions of the seat rails 18. A front space that is surrounded by the pair of seat rails 18 and the pair of subframes 19 is an accommodation space for an ABS unit 20. The ABS unit 20 is disposed in this accommodation space and is located, in the vehicle front-rear direction, at a position that is in the rear of the rear cushion unit 75 and in front of the front end of the rear wheel. A pair of frame brackets 50 project inward from the respective subframes 19. The ABS unit 20 is attached to the top surface 52 (see FIG. 3) of a floating bracket 51 which is a plate-like member and suspended so as to link the pair of frame brackets 50. Alternatively, one or both of the frame brackets 50 may be disposed so as to project inward from the seat rail(s) 18.

As shown in FIG. 2, the ABS unit 20 detects wheel speeds with wheel speed sensors 32 and 42 which are attached to a front wheel and a rear wheel 41, respectively, and controls braking automatically to prevent wheel locking. The ABS unit 20 is an integrated unit consisting of a control unit 21 and a hydraulic unit (HU) 22. The hydraulic unit 22 has a hydraulic circuit that is divided into a front system and a rear system, that is, separate systems for the front wheel 31 and the rear wheel 41. More specifically, the hydraulic unit 22 includes inlet solenoid valves 23a and 23b, outlet solenoid valves 24a and 24b, one-way valves 25a and 25b, reservoirs 26a and 26b, and pumps 27a and 27b which belong to the respective systems.

In the front system, hydraulic pressure supplied from a master cylinder 34 manipulated by a front brake lever 33 acts on front brake calipers 35 via the inlet solenoid valve 23a. If a sudden drop of a rotation speed of the front wheel 31 is detected, the inlet solenoid valve 23a shuts off the transmission of hydraulic pressure from the master cylinder 34 and the hydraulic pressure is lowered by having brake oil released from the front brake calipers 35 to the reservoir 26a by opening the outlet solenoid valve 24a. Oil that has stayed temporarily in the reservoir 26a is sucked by the pump 27a and thereby returned to the master cylinder 34 side. In the rear system, hydraulic pressure supplied from a master cylinder 44 manipulated by a rear brake pedal 43 is controlled in the same manner as in the front system.

A control unit 21 is composed of an input-side interface, an output-side interface, a processor, a memory, etc. The memory consists of one or plural ones of a ROM (read-only memory), a RAM (random access memory), etc. depending on a use. The memory is stored with various programs and various parameters of the ABS control. A brake light switch, the wheel speed sensors 32 and 42, etc. are connected to the input-side interface. The solenoid valves 23a, 23b, 24a, and 24b, an indicator lamp 49, a motor 29, etc. are connected to the output-side interface.

In the ABS unit 20, the solenoid valves 23a, 23b, 24a, and 24b and the motor 29 are controlled on the basis of wheel speeds of the front wheel 31 and the rear wheel 41 detected by the wheel speed sensors 32 and 42, acceleration, and a vehicle body posture indicated by an angular velocity or the like. More specifically, if the wheel speeds of the front wheel 31 and the rear wheel 41 have become low relative to a vehicle body speed, the ABS unit 20 prevents wheel locking by controlling the maintenance and reduction of brake pressures. On the other hand, if the wheel speeds of the front wheel 31 and the rear wheel 41 have become close to a vehicle body speed, the ABS unit 20 performs a control so as to increase brake pressures. By repeating such controls, proper deceleration can be attained without locking of the front wheel 31 and the rear wheel 41 even on, for example, a slippery road surface.

Figure 3:
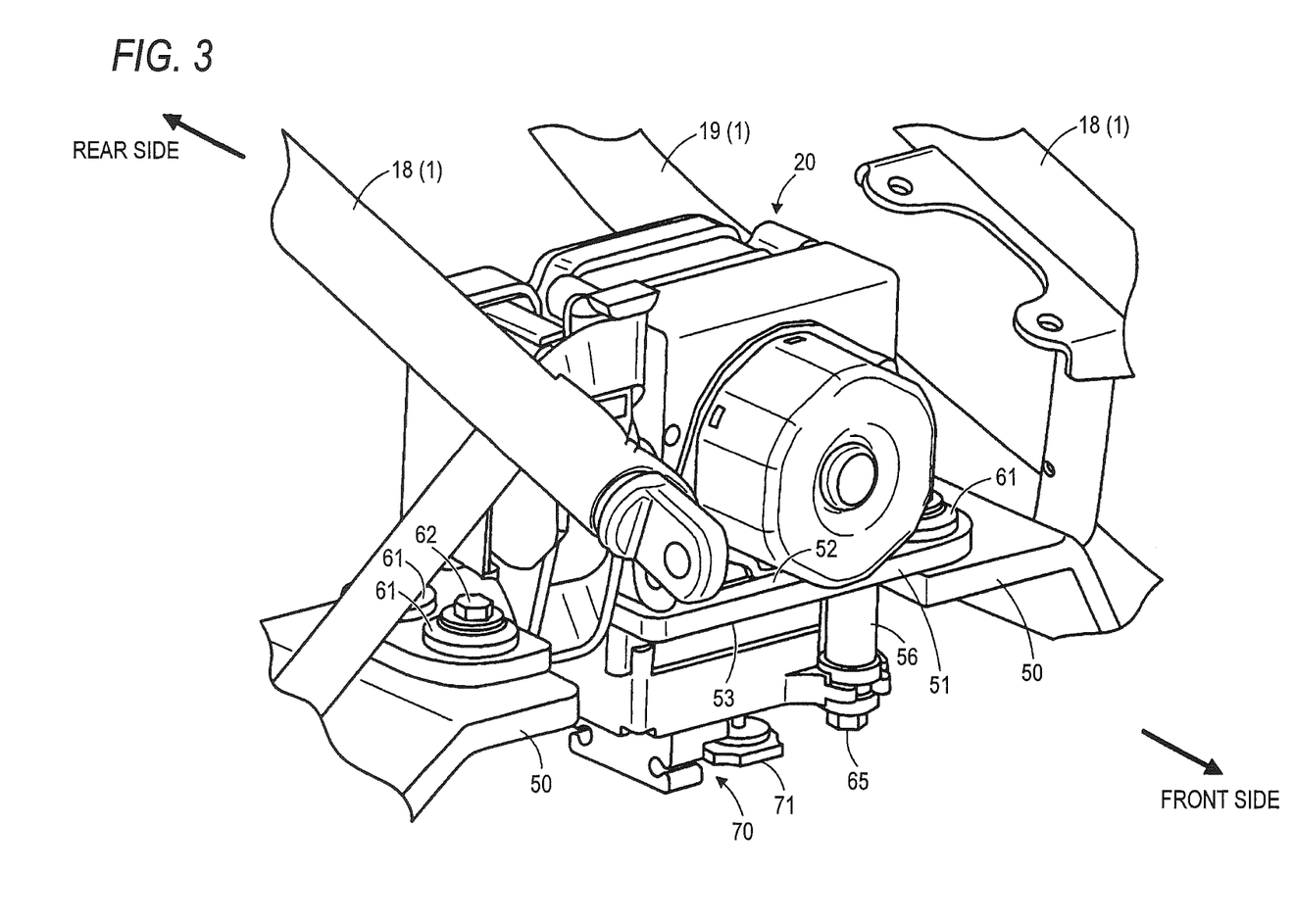
FIG. 3 is a perspective view of an ABS unit attachment structure according to the embodiment.

Incidentally, since strict vibration conditions are set for the ABS unit 20, the floating bracket 51 to which the ABS unit 20 is attached is supported by the pair of frame brackets 50 in a floated manner via rubber bushes 61 (see FIG. 3). However, vibration that travels from the body frame 1 to the ABS unit 20 may not be absorbed sufficiently merely by the rubber bushes 61 to cause a situation that the vibration conditions for the ABS unit 20 are not satisfied. In view of this, in the embodiment, in addition to the ABS unit 20 a weight is attached to the floating bracket 51, whereby the natural frequency is lowered and the floating bracket 51 is made less prone to vibrate.

Components other than the ABS unit 20, such as an exhaust valve actuator 70, are supported by the vehicle body frame 1. To attach a component such as the exhaust valve actuator 70 to the vehicle body frame 1, it is necessary to, for example, use a separate bracket. In the embodiment, the exhaust valve actuator 70 is attached, as a weight, to the floating bracket 51 to which the ABS unit 20 is attached.

This makes it unnecessary to use a separate bracket for the exhaust valve actuator 70 and thereby makes it possible to reduce the number of components, thus enabling reduction in weight and cost.

Figure 4:
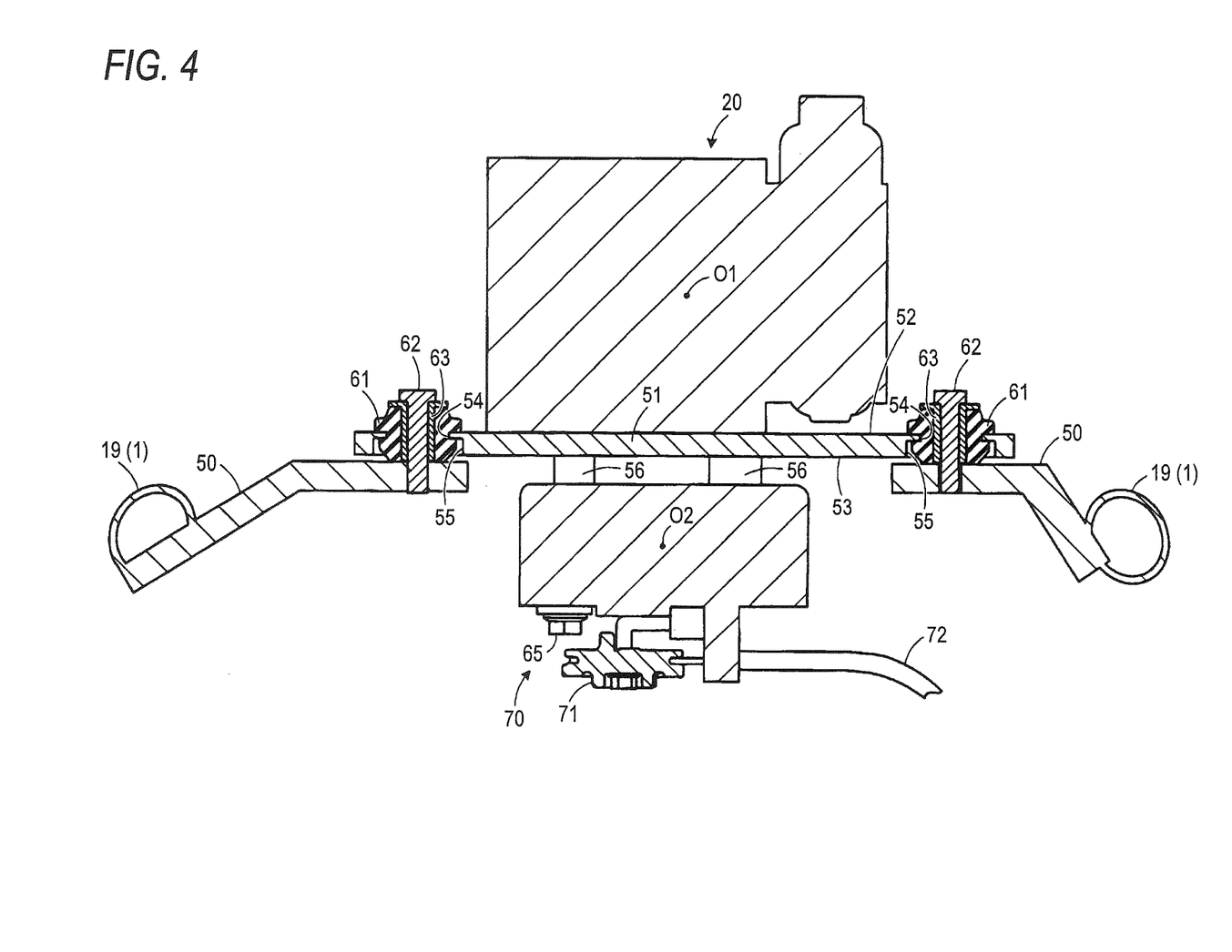
FIG. 4 is a schematic sectional view of the ABS unit attachment structure according to the embodiment.

An ABS unit attachment structure according to the embodiment will be described below with reference to FIGS. 3 and 4. FIGS. 3 and 4 are a perspective view and a schematic sectional view of the ABS unit attachment structure according to the embodiment, respectively.

As shown in FIGS. 3 and 4, the floating bracket 51 is fixed to the pair of frame brackets 50 which are fixed to the vehicle body frame 1 by, for example, welding so as to project inward, via the plural rubber bushes 61 using plural bolts 62. More specifically, end portions, to which the rubber bushes 61 are attached, of the floating bracket 51 are attached to the top surfaces of the frame brackets 50, respectively. The left and right end portions of the floating bracket 51 are formed with through-holes 54 in which the respective tubular rubber bushes 61 are inserted, and also formed, on its back surface 53 side, with recesses 55 which are continuous with the respective through-holes 54. When the rubber bushes 61 are inserted in the through-holes 54, upper half portions of the rubber bushes 61 project from the level of the top surface 52 of the floating bracket 51, and lower half portions of the rubber bushes 61 occupy the recesses 55. In this state, bottom portions of the rubber bushes 61 stick downward out of the back surface 53 of the floating bracket 51.

Cylindrical collars 63 are attached to the inner circumferential surfaces of the rubber bushes 61, respectively, and male screw portions of the bolts 62 are inserted through the respective collars 63 and engaged with respective female screws of the frame brackets 50. Since the bottom portions of the rubber bushes 61 stick downward out of the back surface 53 of the floating bracket 51, gaps are formed between the floating bracket 51 and the frame brackets 50. Since the upper half portions of the rubber bushes 61 project from the level of the top surface 52 of the floating bracket 51, the heads of the bolts 62 do not come into direct contact with the floating bracket 51. In this manner, the floating-bracket 51 is supported in a floated manner by the frame brackets 50 via the rubber bushes 61.

The top surface 52 of the floating bracket 51 is a first attachment surface to which the ABS unit 20 is attached, and the ABS unit 20 is fixed to the floating bracket 51 by plural bolts (not shown) that are inserted through the floating bracket 51 from its back surface 53 side. The back surface (bottom surface) 53 of the floating bracket 51 is a second attachment surface to which the exhaust valve actuator 70 is attached. The exhaust valve actuator 70 is fixed to the floating bracket 51 by screwing a pair of bolts 65 into a pair of female screws formed in the floating bracket 51 with a pair of cylindrical collars 56 sandwiched between the exhaust valve actuator 70 and the back surface 53 of the floating bracket 51. By using the collars 56, the exhaust valve actuator 70 is fixed to the floating bracket 51 in such a manner that its portions other than a pair of attachment flanges (fastening portions) that project forward and rearward, respectively, are spaced from the back surface 53 of the floating bracket 51.

The exhaust valve actuator 70, which serves to vary the exhaust efficiency by moving an exhaust valve 76 (see FIG. 1) for varying the cross section of the inside passage of a collecting pipe 78, drive-controls the exhaust valve 76 via wires that are connected to a drive unit 71. As shown in FIG. 1, the wires which are protected by respective outer casings 72 are connected to the exhaust valve 76 at a position adjacent to a collecting pipe 78, connected to a muffler 77, of exhaust pipes (not shown). Since the floating bracket 51 is shared by the ABS unit 20 and the exhaust valve actuator 70, it is not necessary to prepare a bracket that is dedicated to the exhaust valve actuator 70. Furthermore, since the exhaust valve actuator 70 is used as a weight, it is not necessary to prepare a separate weight.

As described above, in addition to the ABS unit 20 the exhaust valve actuator 70 is attached to the floating bracket 51. Both of the ABS unit 20 and the exhaust valve actuator 70 are fixed to the vehicle body frame 1 via the rubber bushes 61, and vibration coming from the vehicle body frame 1 can be absorbed by the rubber bushes 61. In addition, since the exhaust valve actuator 70 functions as a weight, the floating bracket 51 is made less prone to vibrate and hence vibration to travel from the vehicle body frame 1 to each of the ABS unit 20 and the exhaust valve actuator 70 can be suppressed effectively.

The ABS unit 20 and the exhaust valve actuator 70 are attached to the top surface 52 and the back surface 53 of the floating bracket 51, respectively. Since the ABS unit 20 and the exhaust valve actuator 70 are arranged so as to overlap with each other in a plan view, vibration of the ABS unit 20 can be suppressed more effectively by bringing the center of gravity $O_2$ of the exhaust valve actuator 70 closer to the center of gravity $O_1$ of the ABS unit 20. The exhaust valve actuator 70 may be fixed by screwing bolts into female screws that are formed in the ABS unit 20. In this case, the number of components can be decreased further, resulting in further cost reduction.

Whereas the ABS unit 20 is fixed to the floating bracket 51 so as to be in contact with its top surface 52, the exhaust valve actuator 70 is fixed to the floating bracket 51 so as to be spaced from its back surface 53. The ABS unit 20 itself vibrates while being driven. By spacing the exhaust valve actuator 70 from the back surface 53 of the floating bracket 51, vibration to travel from the ABS unit 20 to the exhaust valve actuator 70 can be suppressed. Since vibration of each of the ABS unit 20 and the exhaust valve actuator 70 is suppressed, each of them can be disposed at a position where it would otherwise be difficult to satisfy the vibration conditions.

Figure 5:
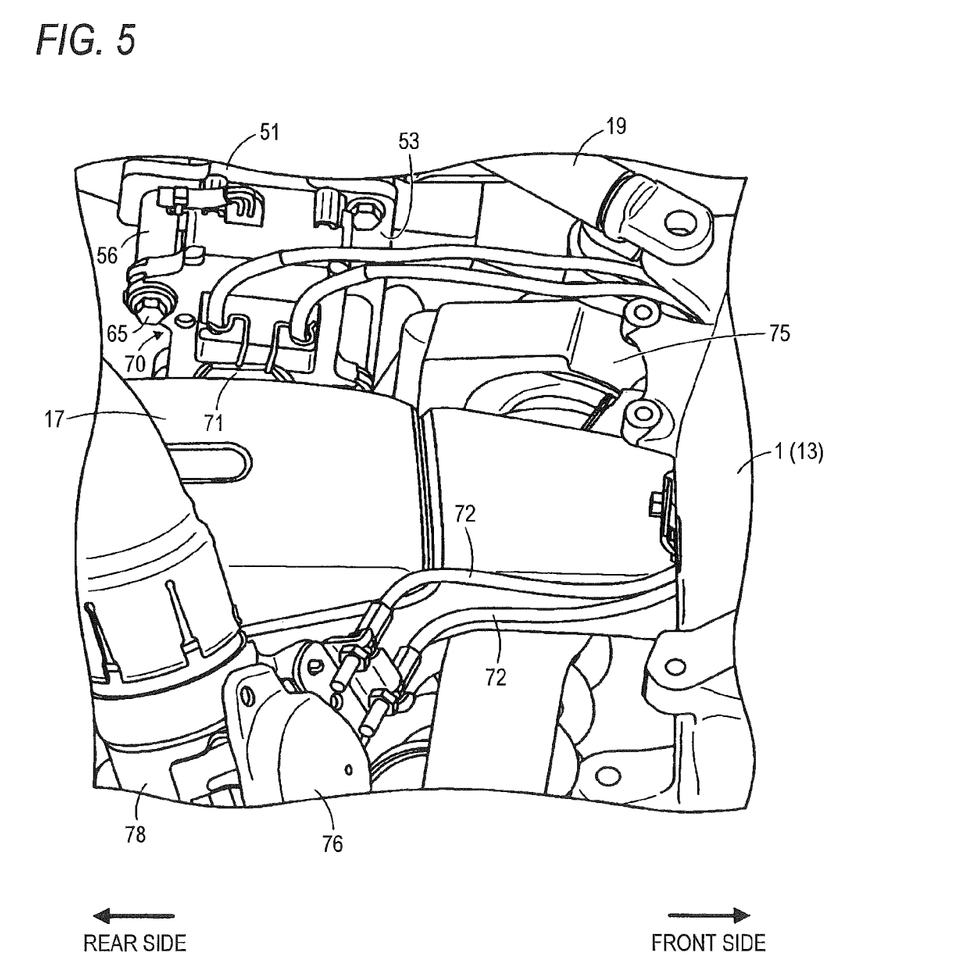
FIG. 5 is a perspective view showing an installation location of a floating bracket employed in the embodiment and its neighborhood.

Next, a description will be made of an installation location of the floating bracket 51. FIG. 5 is a perspective view showing an installation location of the floating bracket 51 employed in the embodiment and its neighborhood. FIG. 5 is a view obtained by looking up the floating bracket 51 obliquely.

As shown in FIG. 5, the floating bracket 51 is disposed in the rear of the rear cushion unit 75 in a state that the ABS unit 20 and the exhaust valve actuator 70 are attached to it (see FIGS. 3 and 4). Since as described above vibration of the ABS unit 20 is suppressed by the floating bracket 51, there are no particular limitations on the installation position of the ABS unit 20. On the other hand, although vibration of the exhaust valve actuator 70 is suppressed by the floating bracket 51 as in the case of the ABS unit 20, trouble would occur if the exhaust valve actuator 70 is disposed at a position that is too distant from the exhaust valve 76.

More specifically, the wires that link the exhaust valve actuator 70 and the exhaust valve 76 are made long and the sliding resistance between each wire and the associated outer casing 72 for protecting it is increased. Furthermore, it becomes necessary to hold the outer casings 72 by the vehicle body frame 1 at more positions. In view of the above, in the embodiment, the floating bracket 51 is fixed to the vehicle body frame 1 so that the exhaust valve actuator 70 is disposed over the exhaust valve 76. More specifically, whereas the rear cushion unit 75 is offset leftward from the vehicle center line extending in the front-rear direction, the exhaust valve actuator 70 is offset from the vehicle center line in the opposite direction, that is, rightward. The drive unit 71 for moving (driving) the wires attached to it is disposed under the exhaust valve actuator 70 and rotated about a vertical axis. Since the exhaust valve actuator 70 is attached to the back surface 53 of the floating bracket 51, the distance between the exhaust valve actuator 70 and the exhaust valve 76 is set smaller.

The outer casings 72 (wires) leading from the exhaust valve actuator 70 are routed so as to extend forward and rightward from the drive unit 71 so as not to obstruct a swing of the swing arm 17 or cause any trouble in the rear cushion unit 75. The outer casings 72 extend forward toward the body frame 13 and go down in front of the swing arm 17 around the swing arm pivot 16 (inside the body frame 13). The outer casings 72 then extend rearward under the swing arm 17 away from the body frame 13 and are connected to the exhaust valve 76.

Since in this manner the exhaust valve actuator 70 and the exhaust valve 76 are disposed closer to each other, the lengths of the outer casings 72 (wires) are shortened, whereby the sliding resistance between each wire and the associated outer casing 72 is reduced. Furthermore, the number of positions where the outer casings 72 are held by the vehicle body frame 1 is minimized.

The floating bracket 51 is disposed on the vehicle center line extending in the front-rear direction. Therefore, the ABS unit 20 and the exhaust valve actuator 70 are also located on the vehicle center line, whereby the vehicle weight is balanced well in the width direction to increase the stability of steering. Furthermore, since the ABS unit 20 and the exhaust valve actuator 70 are combined by the floating bracket 51 into a single unit, work of attaching the ABS unit 20 and the exhaust valve actuator 70 is made easier than in a case of attaching them to the vehicle body frame 1 individually.

As described above, in the embodiment, since the floating bracket 51 to which the ABS unit 20 is attached is supported by the vehicle body frame 1 in a floated manner via the rubber bushes 61, vibration coming from the vehicle body frame 1 is absorbed by the rubber bushes 61. The floating bracket 51 is made less prone to vibrate because the total weight of what are supported by the floating bracket 51 is increased by the weight of the exhaust valve actuator 70 which is attached to the floating bracket 51 in addition to the ABS unit 20. Therefore, vibration coming from the vehicle body frame 1 is made less prone to travel to the ABS unit 20, which means that an effective vibration preventive measure has been taken for the ABS unit 20. Furthermore, the layout involving the ABS unit 20 is not restricted by the vibration preventive measure and, instead, is increased in the degree of freedom.

The invention is not limited to the above embodiment and various modifications are possible. The sizes and shapes of the members employed in the embodiment are not restricted to those shown in the accompanying drawings and can be changed as appropriate as long as the advantages of the invention can be attained. Other modifications can also be made as appropriate as long as the object of the invention is attained.

For example, although in the embodiment the ABS unit 20 is attached to the top surface 52 (first attachment surface) of the floating bracket 51 and the exhaust valve actuator 70 is attached to the back surface 53 (second attachment surface) of the floating bracket 51, the invention is not limited to this configuration. A configuration is possible in which the ABS unit 20 is attached to the back surface 53 of the floating bracket 51 and the exhaust valve actuator 70 is attached to the top surface 52 of the floating bracket 51.

Although in the embodiment the floating bracket 51 is a flat plate that is parallel with the left-right direction and whose top surface 52 and back surface 53 serve as the first attachment surface and the second attachment surfaces, respectively, the invention is not limited to this configuration. There are no particular limitations on the shape of the floating bracket 51. For example, the floating bracket 51 may be an L-shaped plate having surfaces that are parallel with the left-right direction and surfaces that extend vertically from edges of the above surfaces and are parallel with the vertical direction. In this case, aside surface, perpendicular to the vehicle left-right direction, of the floating bracket 51 may serve as the first attachment surface or the second attachment surface.

Although in the embodiment the floating bracket 51 is fixed to the vehicle body frame 1 via the rubber bushes 61 which are vibration absorbing members, the invention is not limited to this configuration. It suffices that the vibration absorbing members be made of a material capable of absorbing vibration to travel from the vehicle body frame 1 to the floating bracket 51; for example, they may be elastic bodies such as springs or be made of a foam material such as sponge.

Although in the embodiment the exhaust valve actuator 70 is employed as an example weight, the invention is not limited to this configuration. The weight may be any member that is attached to the floating bracket 51, and may be an ECU (engine control unit), for example.

Although in the embodiment the exhaust valve actuator 70 is fixed to the floating bracket 51 via the collars 56 so as to be spaced from the back surface 53 of the floating bracket 51, the invention is not limited to this configuration. Where vibration that occurs while the ABS unit 20 is driven is not serious, the exhaust valve actuator 70 may be fixed to the back surface 53 of the floating bracket 51 in such a manner as to be in contact with it.

Although in the embodiment the floating bracket 51 is disposed over the exhaust valve 76, the invention is not limited to this configuration. There are no particular limitations on the installation position of the floating bracket 51 in the case where long wires that link the exhaust valve actuator 70 to the exhaust valve 76 cause no problems.

Providing the above-described advantage that the transmission of vibration to an ABS unit can be suppressed sufficiently, the invention is particularly useful when applied to ABS unit attachment structures for motorcycles.

What is claimed is:

1. An ABS unit attachment structure comprising:
   a floating bracket which is fixed to a vehicle body frame via a vibration absorbing member, and having side parts;
   an ABS unit attached to a first attachment surface of the floating bracket; and
   a weight attached to a second attachment surface of the floating bracket;
   wherein
      both the side parts of the floating bracket are fixed to the vehicle body frame,
      the ABS unit and the weight are between positions at which the both side parts are fixed to the vehicle body frame, and
      the floating bracket is disposed on a hypothetical center line passing through a center of a vehicle body in width of the vehicle body and extending in a front-rear direction of the vehicle body,
the ABS unit and the weight are positioned on the hypothetical center line.

2. The ABS unit attachment structure according to claim 1, wherein the first attachment surface and the second attachment surface are a top surface and a back surface of the floating bracket, respectively.

3. The ABS unit attachment structure according to claim 1, wherein the weight is an exhaust valve actuator.

4. The ABS unit attachment structure according to claim 2, wherein the weight is an exhaust valve actuator.

5. The ABS unit attachment structure according to claim 3, wherein the floating bracket is fixed to the vehicle body frame so that the exhaust valve actuator is located over an exhaust valve.

6. The ABS unit attachment structure according to claim 4, wherein the floating bracket is fixed to the vehicle body frame so that the exhaust valve actuator is located over an exhaust valve.

7. A motorcycle comprising the ABS unit attachment structure according to claim 1.

* * * * *